United States Patent
Patel et al.

(10) Patent No.: US 11,668,594 B2
(45) Date of Patent: Jun. 6, 2023

(54) METHODS FOR CONTROLLING PUMP FLOW RATE BASED ON PUMP FLOW RATE ESTIMATION USING PUMP HEAD AND PERFORMANCE CURVES AND PUMP CONTROL SYSTEMS HAVING THE SAME

(71) Applicant: Saudi Arabian Oil Company, Dhahran (SA)

(72) Inventors: Kalpesh Madhusudan Patel, Dhahran (SA); Rohit Patwardhan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 391 days.

(21) Appl. No.: 16/913,248

(22) Filed: Jun. 26, 2020

(65) Prior Publication Data
US 2021/0404854 A1   Dec. 30, 2021

(51) Int. Cl.
*G01F 15/075* (2006.01)
*G01F 25/10* (2022.01)
*F04D 15/00* (2006.01)

(52) U.S. Cl.
CPC ..... *G01F 15/0755* (2013.01); *F04D 15/0088* (2013.01); *G01F 25/10* (2022.01)

(58) Field of Classification Search
CPC ... G01F 15/0755; G01F 25/10; F04D 15/0088
USPC ........................................................ 73/168
See application file for complete search history.

(56) References Cited

U.S. PATENT DOCUMENTS

| 5,129,264 | A | 7/1992 | Lorenc | |
|---|---|---|---|---|
| 2008/0095638 | A1 | 4/2008 | Branecky | |
| 2012/0251292 | A1 | 10/2012 | Tamminen et al. | |
| 2015/0083407 | A1* | 3/2015 | Storm | E21B 43/006 166/250.03 |
| 2016/0010639 | A1* | 1/2016 | Cheng | F04B 49/065 73/168 |

(Continued)

FOREIGN PATENT DOCUMENTS

| CN | 101033748 A | 9/2007 | |
|---|---|---|---|
| DE | 102007009302 A1 * | 9/2007 | ......... F04D 15/0066 |
| DE | 102007009302 A1 | 9/2007 | |

(Continued)

OTHER PUBLICATIONS

Translation of DE-102007009302-A1 (provided by Applicant) (Year: 2007).*

(Continued)

*Primary Examiner* — Nathaniel T Woodward
(74) *Attorney, Agent, or Firm* — Dinsmore & Shohl LLP

(57) ABSTRACT

Systems and methods for determining a pump flow (Q) of a pump are disclosed. A method for determining a pump flow (Q) of a pump includes calculating an inverse of a polynomial equation defining a DP-Q performance curve of a pump, where the inverse is a Q-DP polynomial equation defining the performance of the pump, receiving a pump head (DP) value from a pump head sensor associated with the pump, computing a pump flow based on the Q-DP polynomial equation, comparing the computed pump flow to a preset target flow rate, and automatically controlling a pump parameter of the pump such that the calculated flow rate becomes the preset target flow rate.

20 Claims, 6 Drawing Sheets

(56) References Cited

U.S. PATENT DOCUMENTS

2016/0076549 A1   3/2016   Kelly et al.

FOREIGN PATENT DOCUMENTS

| JP | S6429692 A | 1/1989 |
| JP | 2015121153 A | 7/2015 |
| KR | 100689155 B1 | 2/2007 |

OTHER PUBLICATIONS

International Search Report and Written Opinion dated Aug. 17, 2021 pertaining to International application No. PCT/US2021/033128 filed May 19, 2021, 12 pages.

\* cited by examiner

METHODS FOR CONTROLLING PUMP FLOW RATE BASED ON PUMP FLOW RATE ESTIMATION USING PUMP HEAD AND PERFORMANCE CURVES AND PUMP CONTROL SYSTEMS HAVING THE SAME

TECHNICAL FIELD

Embodiments described herein generally relate to pumps, pumps systems, and methods of controlling pumps based on estimated pump flow rates.

BACKGROUND

Pumps are devices designed to move fluids, such as gases, liquids, or slurries. Oilfields, including, for example, drill sites or offshore platforms, implement numerous pumps for controlling the production from wells. Typically, there is only one production flow measurement device on the test header of the drill site or platform which is shared by all the pumps (i.e., wells), one by one, for production flow measurement. Thus production measurements for oil wells is available intermittently which at times could be once in a few weeks to once a month. Without continuous production measurements, well and associated artificial lift (AL) optimization is a challenge.

Existing methods of estimating pump flow include using pump curves that included a pump head as a function of pump flow and which required repeated iterations of the equation to converge calculated pump head to measured pump head to determine pump flow. For example, information on pressure measurement at the inlet and outlet of the pump provides the pump head. Knowing the pump head, pump flow may either be manually estimated from a 2D pump curve plot or calculated by solving a polynomial equation for the pump curve. However, since the polynomial equation, for example, provided by the vendor, provides a pump head as a function of pump flow, a number of iterations and guesses as to the pump flow value are usually required before converging to a pump flow solution. However, in some instances the pump curves are not monotonic which results in non-convergence or multiple solutions. The presence of iterations, possibility of non-convergence and human involvement in flow estimation makes both the methods unsuitable for online real-time flow estimation that can be used for monitoring and automatic closed loop control.

Accordingly, there is a need to provide continuous oil and water production estimate that can be used to optimize well and AL mechanism.

SUMMARY

In accordance with embodiments of the present disclosure, a method for determining a pump flow (Q) of a pump includes calculating an inverse of a polynomial equation defining a DP-Q performance curve of a pump, where the inverse is a Q-DP polynomial equation defining the performance of the pump, receiving a pump head (DP) value from a pump head sensor associated with the pump, computing a pump flow based on the Q-DP polynomial equation, comparing the computed pump flow to a preset target flow rate, and automatically controlling a pump parameter of the pump such that the calculated flow rate becomes the preset target flow rate.

In accordance with embodiments of the present disclosure, a pump control system includes a fluid pump having a pump head sensor configured to determine pump head (DP) value of the fluid pump, an electronic control unit communicatively coupled to the fluid pump and the pump head sensor. The electronic control unit is configured to calculate, in an offline mode, an inverse of a polynomial equation defining a DP-Q performance curve of a pump, where the inverse is a Q-DP polynomial equation defining the performance of the pump, receive, in an online mode, the pump head (DP) value from the pump head sensor associated with the pump, compute a pump flow (Q) based on the Q-DP polynomial equation, compare the computed pump flow (Q) to a preset target flow rate, and automatically control a pump parameter of the pump such that the calculated flow rate becomes the preset target flow rate.

In accordance with embodiments of the present disclosure, a method for determining a pump flow of a pump includes determining a DP-Q polynomial equation corresponding to a DP-Q performance curve of a pump, sampling the DP-Q polynomial equation within a predefined pump head (DP) range, and computing a least square optimization of the sampled DP-Q polynomial equation thereby generating coefficients for a Q-DP polynomial equation defining an inverse of the DP-Q polynomial equation.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
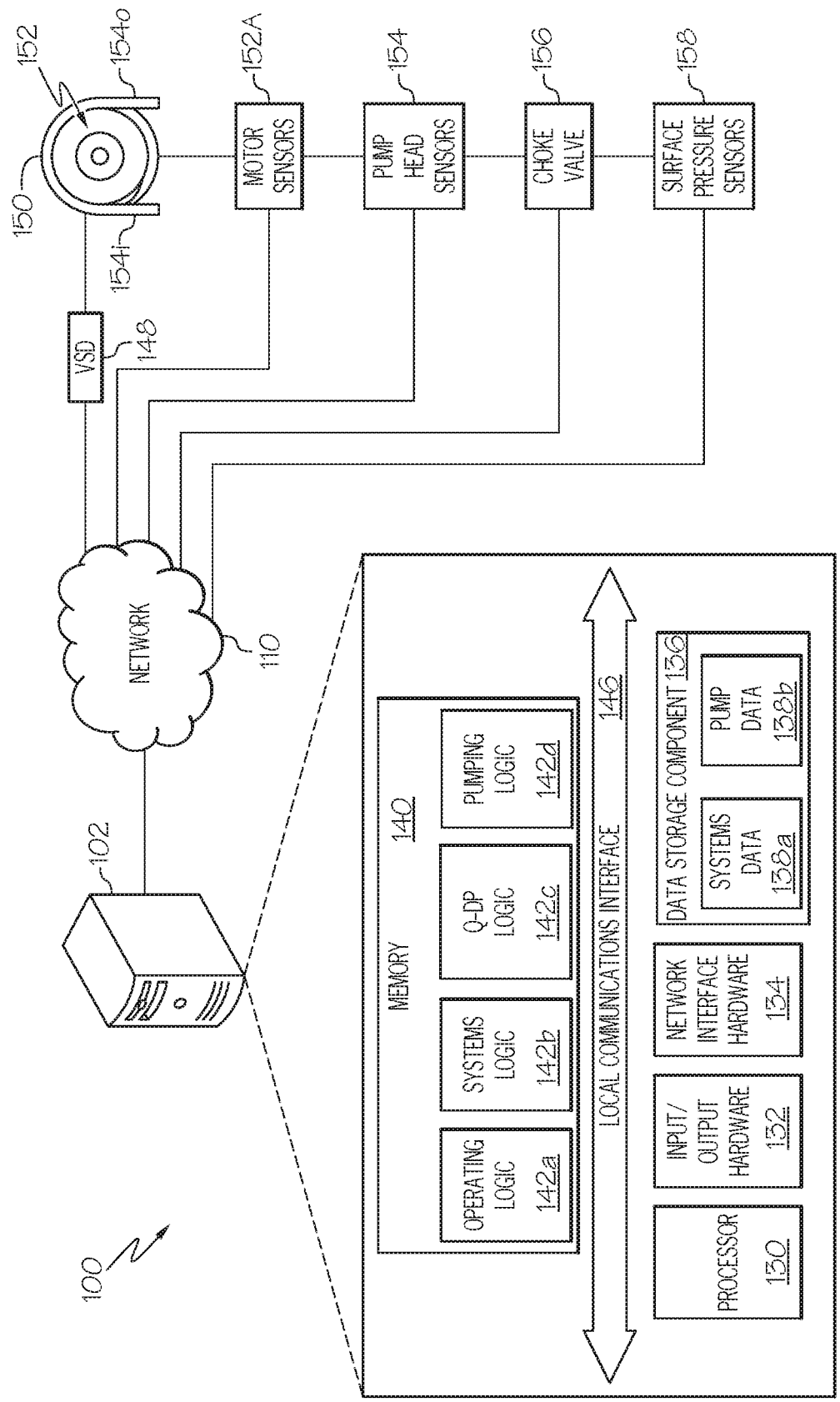
FIG. 1 is an illustrative schematic of a pump control system according to one or more embodiments of the present disclosure.

Embodiments disclosed herein include systems and methods for monitoring and controlling pumps. More specifically, the systems and methods disclosed herein are directed to estimating a pump flow (Q) value based on a pump head (DP) measurement as applied to a polynomial equation.

Pump operation and performance can be described by a few fundamental parameters: pump flow rate (Q), pump head (DP), power, and efficiency. Pump flow rate (Q) is also referred to as capacity, the volume of liquid that travels through the pump in a given time, which is typically measured in gallons per minute or gpm. Pump flow rate (Q) defines the rate at which a pump can push fluid through the system. In some cases, the mass flow rate (ṁ) is also used, which describes the mass through the pump over time. The volume flow rate is related to mass flow rate by the fluid density (ρ) via the equation: $\dot{m}=\rho*Q$.

Pressure is a measure of resistance; the force per unit area of resistance in the system. The pressure rating of a pump defines how much resistance it can handle or overcome. It is usually given in bar or psi (pounds per square inch). Pressure, in conjunction with flow rate and power, is used to describe pump performance. Centrifugal pumps, however, typically use pump head instead of pressure to define the energy or resistance of the pump, since pressure in a centrifugal pump varies with the pumped fluid's specific gravity.

Pump head (DP) is the height above the suction inlet that a pump can lift a fluid. It is a shortcut measurement of system resistance (pressure) which is independent of the fluid's specific gravity. It is defined as the mechanical energy of the flow per unit weight. Pump head (DP) is expressed as a column height of water given in feet (ft) or meters (m). In other words, if water was pumped straight up, the pump head is equivalent to the height it reaches. Pump head (H) can be converted to pressure (P) using the specific gravity (SG) of the fluid by the equation: $P=0.434*DP*(SG)$ or by the density of the fluid (φ and the acceleration due to gravity (g): $P=DP*\rho*g$. Pump head (DP) or differential pressure refers to the difference between the suction pressure and discharge pressure. This means the pump takes at an input suction pressure, adds more pressure (i.e., the design pressure of the pump), and generates discharge pressure. So, the discharge pressure is equal to the suction pressure plus the pump's design pressure.

Net positive suction head (NPSH) is the difference between the pump's inlet stagnation pressure head and the vapor pressure head. Net head is proportional to the power actually delivered to the fluid, which is called output power (Pout) or the water horsepower (measured in horsepower or hp). This is the horsepower rating which describes the useful work the pump will do to the fluid. It can be calculated by the equation: $P_{out}=\dot{m}gH=\rho gQH$, where: ρ is fluid density; g is the acceleration due to gravity; Q is the volumetric flow rate; H is the pump head; and ṁ is the mass flow rate. Lastly, pump efficiency ($\eta_{pump}$) defines the percentage of energy supplied to the pump that is converted into useful work. It is the ratio between the water horsepower and brake horsepower (useful power vs. required power): $\eta_{pump}=P_{out}/P_{in}$.

Pumps have a characteristic or performance curve that describes the pump flow rate produced at net or total head. Pump specifications relating pump head and pump flow rate correlate to those found on its characteristic curve.

Referring to the present concept, embodiments provide a method for determining a polynomial equation that can be implemented in an automatic closed loop control for a pump for situations where pump flow (Q) values may not be directly obtained through sensor data for each pump in an oilfield. For example, the proposed systems and methods involve finding a monotonic inverse of the DP-Q polynomial equation or the DP-Q performance curve describing the pump flow (Q) as a function of pump head (DP) rather than the converse as provided by pump vendors. Once this equation is available, a unique pump flow value can be calculated without computational iterations and then be used for real-time monitoring and control applications. For example, computations of pump flow for a specific pump may be performed in real-time or at predetermined intervals, for example in intervals of 10 minutes or less, optionally 30 minutes or less, optionally 60 minutes or less.

In embodiments, the Q-DP polynomial equation may be predetermined offline by computing the inverse of a polynomial equation defining a DP-Q performance curve of a pump. That is, the Q-DP polynomial equation is generated by computing the inverse of the polynomial equation defining a DP-Q performance curve of the pump. As described in more detail herein, the Q-DP polynomial equation is generated to be monotonic so that it may be implemented in a closed loop automatic control scheme for automatically controlling the production in an oilfield in real time or near real time. Presently, DP-Q performance curves may be non-monotonic which if attempted to be used in an automatic closed loop control they would fail because there would be multiple numerical values for a computed solution. Moreover, pump flow (Q) measurements may not be available for each pump to be controlled. Rather, oilfields have onshore drill sites or offshore platforms with multiple oil wells. Typically, there is only one production flow measurement device on the test header of the drill site or platform which is shared by all the pumps (i.e., wells).

Furthermore, the Q-DP polynomial equation defining the Q-DP performance curve may be implemented in an online pump system. Online, a pump head measurement is obtained and the pump head measurement is input to the polynomial equation to calculate a pump flow value. Accordingly, pump flow may be determined, by calculation or estimation, for a pump without using a flow meter.

The following will now describe these systems and methods in more detail with reference to the drawings and where like numbers refer to like structures.

Referring to FIG. 1, an illustrative schematic of a pump control system 100 is depicted. As illustrated in FIG. 1, an electronic control unit 102 communicatively coupled to one or more fluid pumps 150 having a motor 152, one or more pump head sensors 154 (e.g., an inlet pressure sensor 154i and an outlet pressure sensor 154o), one or more motor sensors 152A (e.g. motor current, voltage, and/or temperature) corresponding to the one or more fluid pumps 150, and one or more choke valves 156 and associated surface pressure sensors 158.

The one or more fluid pumps 150 may be any pump configured to move fluids, such as liquids, or slurries. The fluid pumps 150 may be any type of centrifugal pump such as an electronic submersible pump (ESP). The fluid pump 150 may be driven by the motor 152 and the motor 152 may be powered by a variable speed drive (VSD) 148. The speed of the fluid pumps 150 may be controlled via one or more signals provided by the electronic control unit 102. The fluid pumps 150 may further include pump head sensors 154 for monitoring the head (e.g., differential pressure) of the pump and providing measurements to the electronic control unit 102. The electronic control unit 102 may determine the pump head, the differential pressure, by computing difference between the output pressure (e.g., as provided by the outlet pressure sensor 154o) and the input pressure (e.g., as provided by the inlet pressure sensor 154i). In some embodiments, the pumps may be fluidly coupled to a choke valve 156 that is electronically controllable to restrict the output flow thereby changing the power required by the pump motor. The choke valve 156 may be used to control (i.e., ease or restrict) the pump flow.

The electronic control unit 102 may be communicatively coupled to each of these components and/or others directly or via a network 110. The electronic control unit 102 may include a memory component 140, a processor 130, input/output hardware 132, network interface hardware 134, and a data storage component 136 (which stores systems data 138a, pump data 138b, and/or other data).

Referring to the electronic control unit 102, at least a portion of the components of the electronic control unit 102 may be communicatively coupled to a local interface 146. The local interface 146 is generally not limited by the present disclosure and may be implemented as a bus or other communications interface to facilitate communication among the components of the electronic control unit 102 coupled thereto.

The memory component 140 may be configured as volatile and/or nonvolatile memory. As such, the memory component 140 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the electronic control unit 102 and/or external to electronic control unit 102. The memory component 140 may store, for example, operating logic 142a, systems logic 142b, Q-DP logic 142c, pumping logic 142d, and/or other logic. The operating logic 142a, the systems logic 142b, the Q-DP logic 142c, and pumping logic 142d may each include a plurality of different pieces of logic, at least a portion of which may be embodied as a computer program, firmware, and/or hardware, as an example.

The operating logic 142a may include an operating system and/or other software for managing components of the electronic control unit 102. As described in more detail below, the systems logic 142b may monitor and control operations of one or more of the various other control modules and/or one or more components of the pump control system 100.

The operating logic 142a may include an operating system and/or other software for managing components of the electronic control unit 102. The systems logic 142b may include logic defining operations including monitoring, controlling, and communicating with the one or more components communicatively coupled together with the pump control system 100.

Still referring to FIG. 1, the Q-DP logic 142c may be configured to generate a Q-DP polynomial defining the Q-DP performance curve of a pump (e.g., fluid pump 150). The Q-DP logic will be described in more detail herein, in particular with reference to FIGS. 5 and 6. The pumping logic 142d may be configured to receive and control pump parameters such as pump speed, the degree of opening of a choke valve associated with a pump or the like to meet a preset target flow rate or predefined production target, as described in more detail herein. More generally, adjusting pump parameters of a pump may be accomplished by directly changing a mechanical or electrical property of the pump or by throttling fluid into or out of the pump as well as optionally opening or closing a bypass.

It should be understood that while the various logic modules are depicted in FIG. 1 as being located within the memory component 140, this is merely an example. For example, the systems logic 142b, the Q-DP logic 142c, and/or pumping logic 142d may reside on different electronic control units 102. That is, one or more of the functionalities and/or components described herein may be provided by a user computing device, a remote computing device, and/or another control module that is communicatively coupled to the electronic control unit 102.

Additionally, while the electronic control unit 102 is illustrated with the systems logic 142b, the Q-DP logic 142c, and/or pumping logic 142d as separate logical components, this is also an example. In some embodiments, a single piece of logic (and/or or several linked modules) may cause the electronic control unit 102 to provide the described functionality.

The processor 130 (which may also be referred to as a processing device) may include any processing component operable to receive and execute instructions (such as from the data storage component 136 and/or the memory component 140). Illustrative examples of the processor 130 include, but are not limited to, a computer processing unit (CPU), a many integrated core (MIC) processing device, an accelerated processing unit (APU), a digital signal processor (DSP). In some embodiments, the processor 130 may be a plurality of components that function together to provide processing capabilities, such as integrated circuits (including field programmable gate arrays (FPGA)) and the like.

The input/output hardware 132 may include and/or be configured to interface with the fluid pumps 150, the pump head sensors 154, choke valves 156, microphones, speakers, a display, and/or other hardware. That is, the input/output hardware 132 may interface with hardware that provides a user interface or the like. For example, a user interface may be provided to a user for the purposes of adjusting settings (e.g., setting a predefined production target, coefficients of a Q-DP polynomial equation, etc.), viewing a status of one or more fluid pumps 150, and/or the like.

The network interface hardware 134 may include and/or be configured for communicating with any wired or wireless networking hardware, including an antenna, a modem, LAN port, Wi-Fi card, WiMax card, ZigBee card, Z-Wave card, Bluetooth chip, USB card, mobile communications hardware, and/or other hardware for communicating with other networks and/or devices. From this connection, communication may be facilitated between the electronic control unit 102 and other components of the pump control system 100, such as, for example, the fluid pumps 150, the pump head sensors 154, choke valves 156, and/or the like. In some embodiments, the network interface hardware 134 may also facilitate communication between the electronic control unit 102 and components external to the pump control system 100, such as, for example, user computing devices and/or remote computing devices. As such, the network interface hardware 134 may be communicatively coupled to the I/O port of the electronic control unit 102.

Still referring to FIG. 1, the electronic control unit 102 may be coupled to a network 110 via the network interface hardware 134. As previously described herein, various other control modules, other computing devices, and/or the like may also be coupled to the network. Illustrative other computing devices include, for example, a user computing device and a remote computing device. The user computing device may include a personal computer, laptop, mobile device, tablet, server, etc. and may be utilized as an interface with a user. As an example, a user may send a predefined production target to the electronic control unit 102 for implementation by the pump control system 100. Another example may include the electronic control unit 102 sending notifications to a user of the user computing device.

Still referring to FIG. 1, the data storage component 136 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 136 may reside local to and/or remote from the electronic control unit 102 and may be configured to store one or more pieces of data and selectively provide access to the one or more pieces of data. As illustrated in FIG. 1, the data storage component 136 may store systems data 138a, pump data 138b, and/or other data. The systems data 138a may generally include data relating to the functionality of the electronic control unit 102, such as stored settings, information regarding the location of the electronic control unit 102 and/or other modules within the electronic control unit 102, and/or the like. The pump data 138b may generally relate to characteristic and/or performance data associated with one or more of the fluid pumps 150 for control by the pump control system 100. The pump data 138b may be DP-Q performance curves or DP-Q polynomial equations provided by the manufacture for a particular fluid pump 150.

It should be understood that while the components in FIG. 1 are illustrated as residing within the electronic control unit 102 (and/or a component thereof, such as a control module), this is merely an example. In some embodiments, one or more of the components may reside external to the electronic control unit 102. It should also be understood that, while the electronic control unit 102 is illustrated as a single device, this is also merely an example. That is, the electronic control unit 102 may be a plurality of devices (e.g., a plurality of hot swappable control modules) that are communicatively coupled to one another and provide the functionality described herein.

Figure 2:
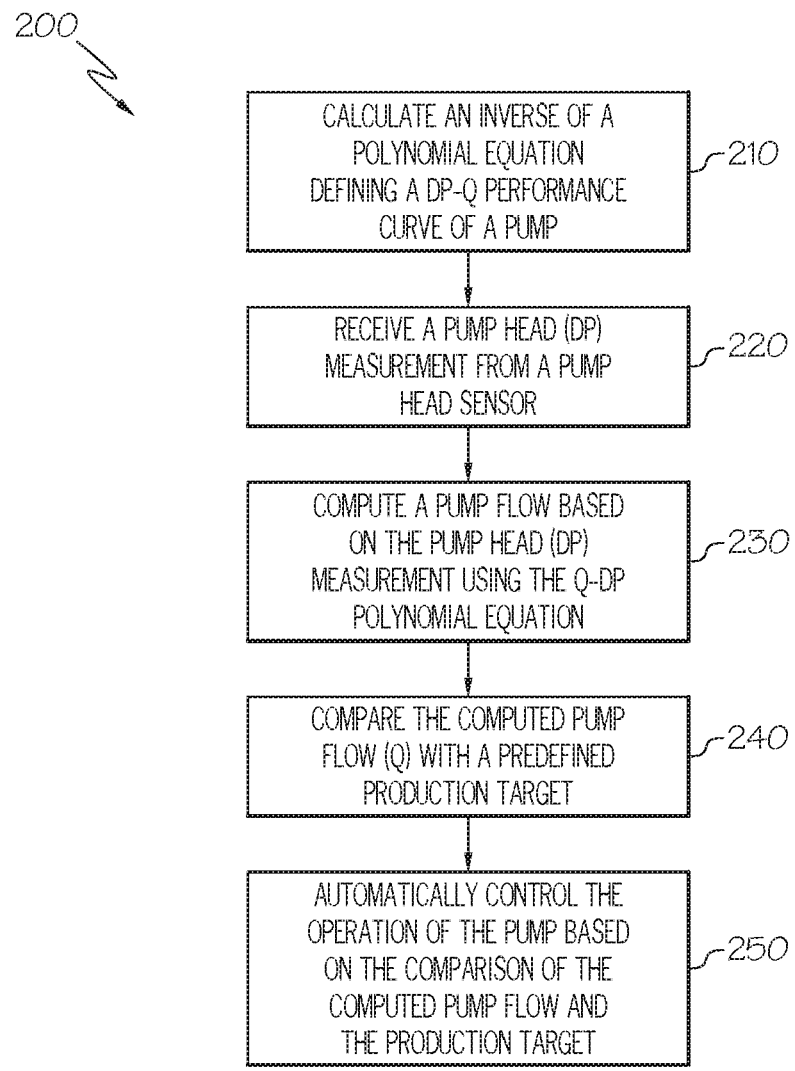
FIG. 2 is an illustrative flow diagram of a method for controlling the operation of one or more fluid pumps by the pump control system according to one or more embodiments of the present disclosure.

Turning to FIG. 2 an illustrative flow diagram of a method for controlling the operation of one or more fluid pumps 150 by the pump control system 100. The method may be implemented as one or more logic modules previously described with reference to the electronic control unit 102 for optimizing pump performance and operation to deliver on desired production targets for automatically and in real-time or near real-time.

At block 210, the electronic control unit 102, calculates an inverse of a polynomial equation defining a DP-Q performance curve of a fluid pump 150. The inverse of the polynomial equation defining a DP-Q performance curve of a fluid pump 150 is referred to herein as the Q-DP polynomial equation. Details regarding how the Q-DP polynomial equation is calculated will be described in more detail herein. The Q-DP polynomial equation is a monotonic equation that may be implemented online in the pump control system 100 to drive pump controls parameters such as pump speed or the degree of an opening of a choke valve within the pump system, such as within an oilfield.

At block 220, the electronic control unit 102 may receive a pump head (DP) value, for example, a measurement or a calculation, from the pump head sensors 154 associated with the fluid pump 150. For example, the pump head (DP) value may be a measurement of a pressure value associated with the fluid pump 150 under its current operating conditions. For example, pump head (DP) values are generally defined by the height at which a pump can raise water, however, the height measurement may also be converted and expressed as a pressure value. At block 230, the electronic control unit 102, using the calculated Q-DP polynomial equation for the fluid pump 150, may compute a pump flow (Q) value based on the pump head (DP) measurement.

In some embodiments, the electronic control unit 102, at block 240, the computed pump flow (Q) value is compared with a target pump flow corresponding to a predefined production target. In response to the comparison, the electronic control unit 102 may automatically control the operation of the fluid pump by adjusting one or more parameters of the fluid pump to achieve the predefined production target, optionally, while considering other measures/calculated variables, at block 250.

It should be understood that the aforementioned method of controlling the operation of one or more fluid pumps 150 by the pump control system 100 is merely one example. There may be various methods of implementing control of a fluid pump 150, however, the present disclosure is directed to implementing control by using a Q-DP polynomial equation that can be implemented in an automatic closed loop control system as described, for example, herein.

It should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The proposed method of estimating pump flow using a monotonic inverse of the performance curve polynomial equation for a pump addresses several issues present with other techniques to estimating pump flow. Some of these issues include the incompatibility of vendor provided performance information with a system that needs to determine a pump flow from a pump head value. That is, vendor provided performance information defines pump performance by representing pump head as a function of pump flow and not pump flow as a function of pump head. Therefore, to utilize vendor data the performance curve or corresponding polynomial equation characterizing the performance curve an inverse would need to be determined. However, the performance curves may be non-monotonic, thus there is a possibility of non-convergence due to the presence of multiple solutions for a single input measurement. Accordingly, human involvement would generally be required to resolve the non-convergence complication.

The proposed method addresses and eliminates all the issues mentioned above. The method involves a onetime offline activity of finding a monotonic inverse of the performance curve polynomial equation offline so that it represents the pump flow as a function of pump head rather than the opposite as provided by pump vendors. Once this equation is available, it can be implemented online to calculate a unique pump flow value, without iteration and convergence problem, that can be used for monitoring and control applications.

Figure 3A:
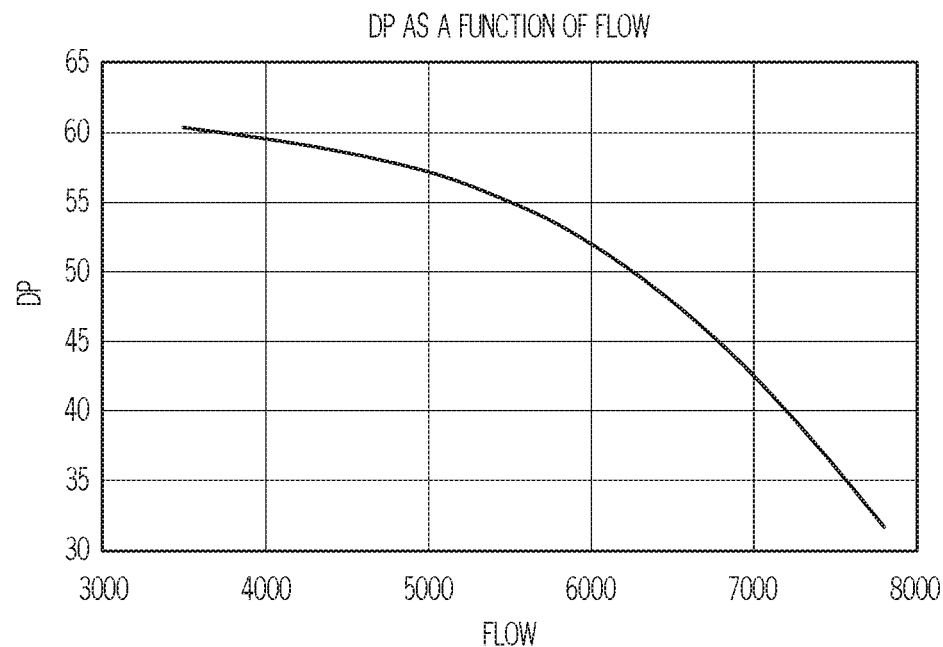
FIG. 3A depicts an example of a vendor provided DP-Q performance curve for a pump according to one or more embodiments of the present disclosure.
Figure 3B:
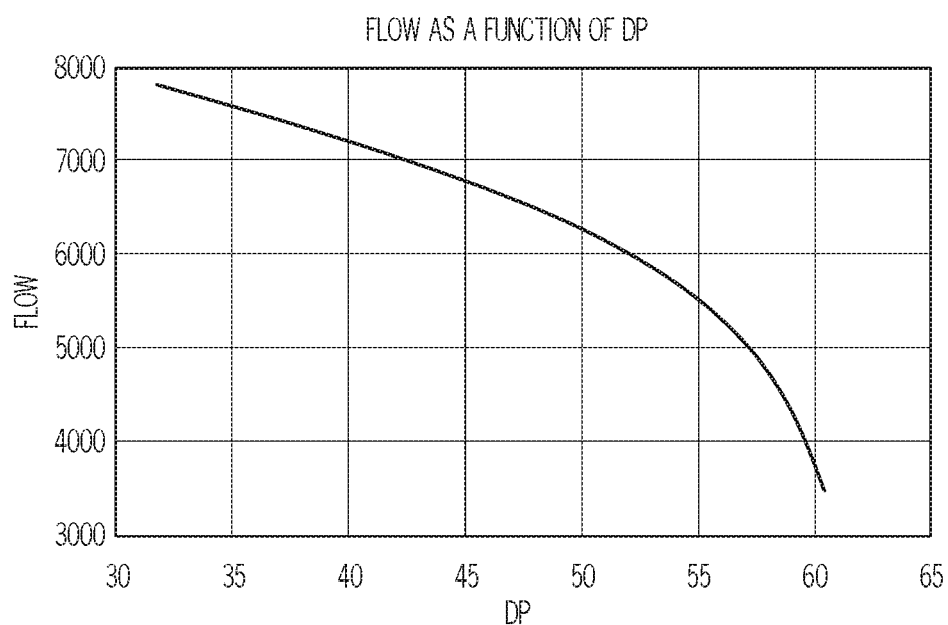
FIG. 3B depicts an example of a Q-DP performance curve, the inverse of FIG. 3A, for a pump according to one or more embodiments of the present disclosure.
Figure 4A:
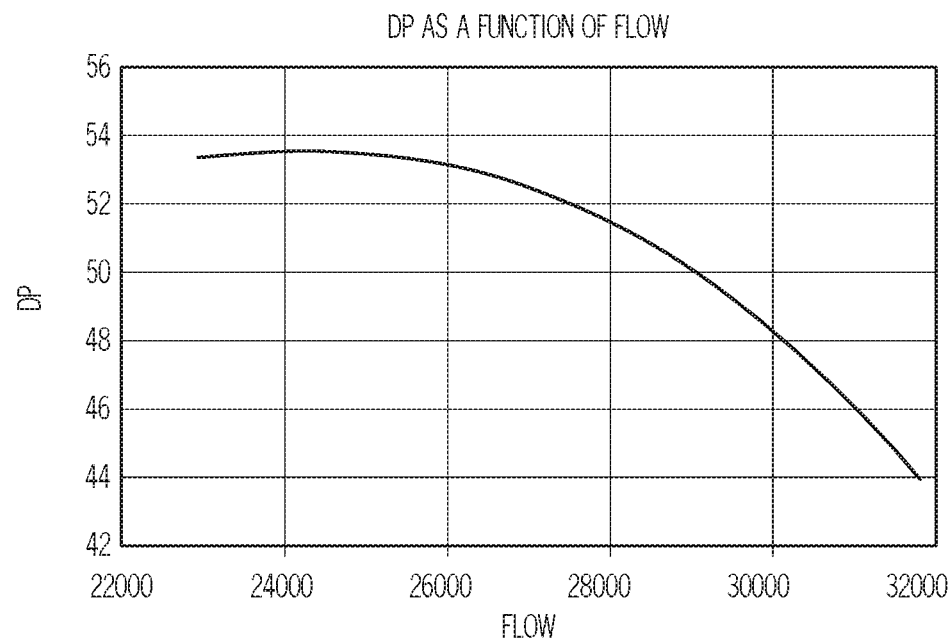
FIG. 4A depicts an example of a vendor provided non-monotonic DP-Q performance curve for a pump according to one or more embodiments of the present disclosure.
Figure 4B:
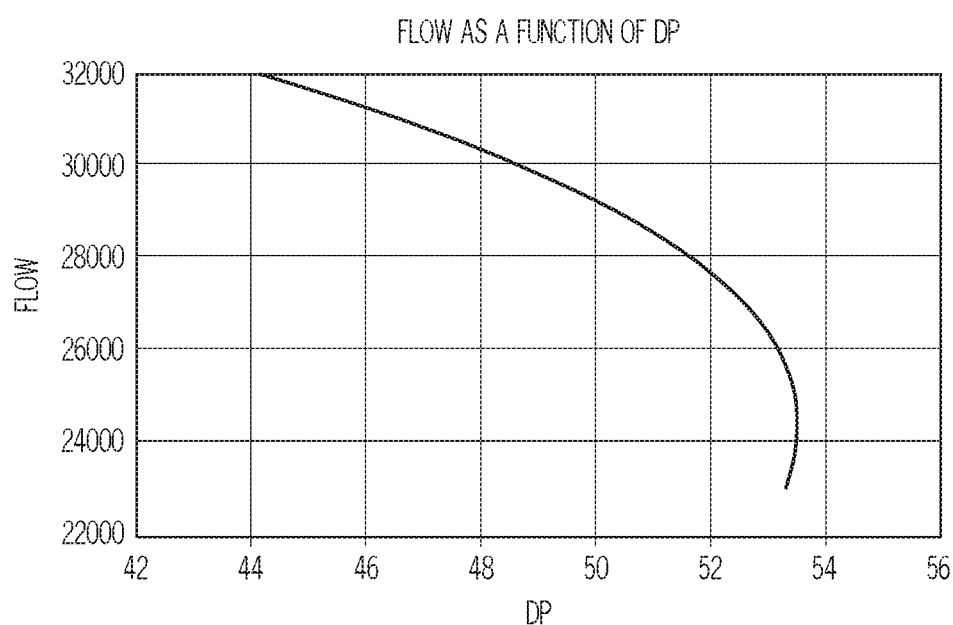
FIG. 4B depicts an example of a non-monotonic Q-DP performance curve, the inverse of FIG. 4A, for a pump according to one or more embodiments of the present disclosure.

FIGS. 3A and 3B, depict an example of a vendor provided (i.e., a predetermined plotted curve of pump head and flow rate created in advance by measurement or a calculation) DP-Q performance curve (FIG. 3A) and its inverse, a Q-DP performance curve (FIG. 3B) for the same fluid pump. FIGS. 3A and 3B represent the case where the DP-Q performance curve is monotonic and thus the inverse is naturally monotonic. However, this is not always the case. FIGS. 4A and 4B depict an example of a vendor DP-Q performance curve (FIG. 4A) and its inverse, a Q-DP performance curve, each of which are non-monotonic. For example, as illustrated for a DP of approximately 53 there are two flow rates that could be associated with the DP of approximately 53. In order to implement such a DP-Q performance curve in an automatic closed loop pump control system the corresponding inverted Q-DP polynomial equation needs to be monotonic.

Figure 5A:
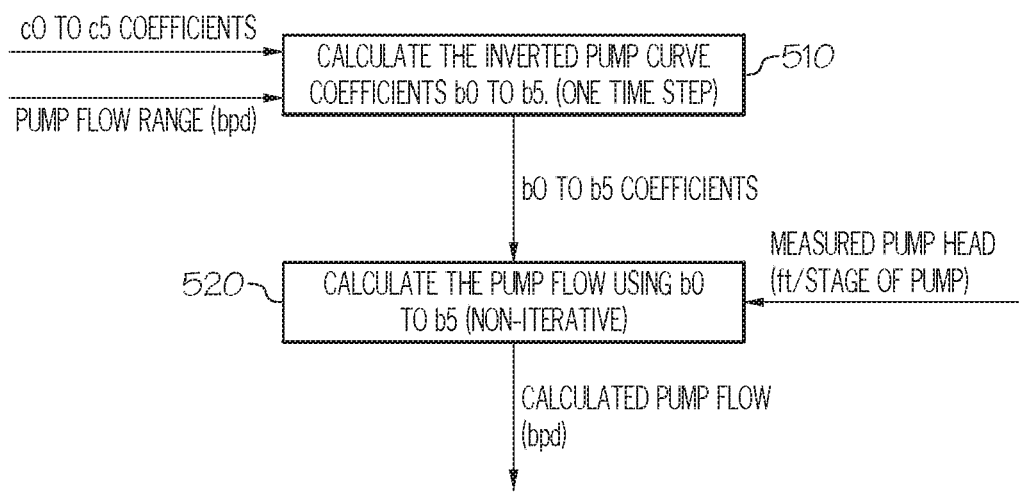
FIG. 5A depicts a block diagram of a method for calculating pump flow according to one or more embodiments of the present disclosure.
Figure 5B:
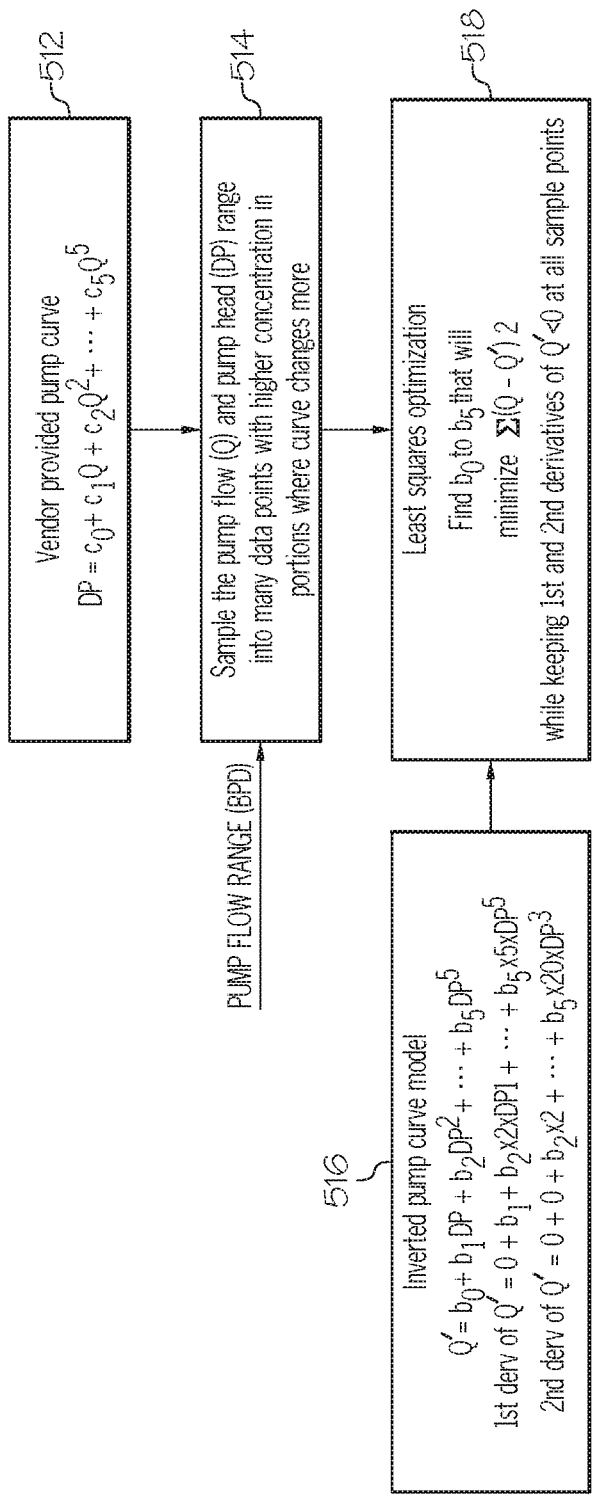
FIG. 5B depicts a block diagram of algorithm for computing the monotonic inverse of the DP-Q performance curve for a fluid pump.

The method for computing a monotonic inverse of an original monotonic or non-monotonic DP-Q performance curve will now be described in detail. The method will be described in detail with reference to FIGS. 5A and 5B. FIG. 5A depicts a block diagram of the proposed method and FIG. 5B depicts a block diagram of algorithm for computing the monotonic inverse of the DP-Q performance curve for a fluid pump.

Referring generally to FIG. 5A, computing an inverse of the pump curve involves finding the coefficients $b_0$ to $b_5$ in the Q-DP polynomial equation:

$$Q=b_0+b_1DP+b_2DP^2+\ldots+b_5DP^5$$

when the coefficients $c_0$ to $c_5$ in the vendor provided DP-Q performance curve equation, mentioned below, are known $$DP=c_0+c_1Q+c_2Q^2+\ldots+c_5Q^5$$

where DP represents the differential pressure or pump head in ft/stage of the pump at a reference speed and Q represents the pump flow in barrels per day, bpd, at the reference speed as depicted by block 510. Once the inverse equation with coefficients $b_0$ to $b_5$ is known, flow (Q) can be calculated by using the pump head (DP) measurement from a pump head sensor associated with the fluid pump to be monitored and/or controlled as depicted by block 520.

The inverse pump curve coefficients are calculated using least squares optimization with additional constraints on 1st and 2nd derivatives of the pump curve to ensure that the inverted pump curve is monotonic and matches the vendor curve as closely as possible. That is, the process performed in block 510 is more fully exampled with reference to FIG. 5B.

Referring now to FIG. 5B, the computing device, such as an electronic control unit 102 as described with reference to FIG. 1, may receive the vendor provided performance curve in the form of a DP-Q polynomial equation at block 512. In some embodiments, the DP-Q polynomial equation may be determined by fitting a line to the performance curve data provided by the vendor or otherwise determined through characterizing the pump in operation. A solving tool such as Matlab® may be configured, in an offline environment, to sample the pump flow (Q) and DP range into 100s or 1000s, for example, 1000 to 2000 data points at block 514. The sampling need not be performed in uniform intervals. That is, higher concentrations of samples may be taken in along portions of the curve where there are changes in slope greater than a predetermined value. At block 516, models for optimization by the solving tool are defined. To assure a monotonic inverse is computed, at least three parametrized equations are defined: 1) the Q-DP polynomial equation, 2) the first derivative of the Q-DP polynomial equation, and 3) the second derivative of the Q-DP polynomial equation. At block 518, the solving tool performs a least squares optimization using, for example, but without limitation, the three parametrized equations. In particular, the least square optimization is carried out to find coefficients $b_0$ to $b_5$ ... that will minimize $\Sigma(Q-Q')^2$ while keeping $1^{st}$ and $2^{nd}$ derivatives of Q'<0 at all sample points.

In other words, the least square optimization is run to find b0 to b5 that minimizes the error in flow obtained from the new (Q') and original (Q), vendor provided, pump curve while keeping the $1^{st}$ and $2^{nd}$ derivatives less than 0. The purpose of $1^{st}$ and $2^{nd}$ derivative is to force the least square optimization to come up with an inverted curve which monotonically decreases.

As described above, the monotonic inverse Q-DP polynomial computed by the method described herein may be implemented online, that is in an automatic closed loop pump control system to independently monitor and control each of a plurality of pumps within a pump system (e.g., and oilfield).

As illustrated herein, various embodiments for monitoring and controlling pumps are disclosed. The systems and methods disclosed herein estimate pump flow (Q) value based on a pump head (DP) measurement as applied to a monotonic polynomial equation computed from DP-Q polynomial equation or DP-Q performance curve characterizing the pump. Monotonic equations provide a one to one relationship between inputs and outputs. Therefore, a monotonic equation may be implemented in an automatic closed loop pump control system.

It is understood that the method for determining a pump flow (Q) value of a pump includes calculating an inverse of a polynomial equation defining a DP-Q performance curve of a pump, receiving a pump head (DP) measurement from a pump head sensor associated with the pump, computing a pump flow (Q) value based on the polynomial equation, comparing the computed pump flow (Q) value against a production target, and automatically controlling a pump based on the comparison of computed pump flow (Q) value and the production target while considering other measured and/or calculated variables.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present concept, it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

In a first aspect of the present disclosure, a method for determining a pump flow (Q) of a pump includes calculating an inverse of a polynomial equation defining a DP-Q performance curve of a pump, where the inverse is a Q-DP polynomial equation defining the performance of the pump, receiving a pump head (DP) value from a pump head sensor associated with the pump, computing a pump flow based on the Q-DP polynomial equation, comparing the computed pump flow to a preset target flow rate, and automatically controlling a pump parameter of the pump such that the calculated flow rate becomes the preset target flow rate.

A second aspect of the present disclosure may include the first aspect, where calculating the inverse of the polynomial equation defining the DP-Q performance curve of the pump includes: determining a DP-Q polynomial equation corresponding to the DP-Q performance curve, sampling the DP-Q polynomial equation within a predefined pump head (DP) range, computing a least square optimization of the sampled DP-Q polynomial equation thereby generating coefficients for the Q-DP polynomial equation.

A third aspect of the present disclosure may include the second aspect, where computing the least square optimization to generate coefficients for the Q-DP polynomial equation includes maintaining the 1st derivative of the Q-DP polynomial equation to be less than zero.

A fourth aspect of the present disclosure may include the third aspect, where computing the least square optimization to generate coefficients for the Q-DP polynomial equation includes maintaining the 1st and 2nd derivatives of the Q-DP polynomial equation to be less than zero.

A fifth aspect of the present disclosure may include the second aspect, where computing the least square optimization to generate coefficients for the Q-DP polynomial equation includes minimizing the error in flow obtained from the new (Q') and original (Q) pump curve.

A sixth aspect of the present disclosure may include any one of the first through fifth aspects, where the pump parameter is a speed of a motor of the pump.

A seventh aspect of the present disclosure may include any one of the first through sixth aspects, where the pump parameter is a degree of opening of a choke valve of the pump.

An eighth aspect of the present disclosure may include any one of the first through seventh aspects, where the pump flow (Q) is computed in intervals of 10 minutes or less, optionally 30 minutes or less, optionally 60 minutes or less.

A ninth aspect of the present disclosure may include any one or the first through eighth aspects, where the Q-DP polynomial equation is monotonic.

In a tenth aspect of the present disclosure, a pump control system includes a fluid pump having a pump head sensor configured to determine pump head (DP) value of the fluid pump, an electronic control unit communicatively coupled to the fluid pump and the pump head sensor. The electronic control unit is configured to: calculate, in an offline mode, an inverse of a polynomial equation defining a DP-Q performance curve of a pump, wherein the inverse is a Q-DP polynomial equation defining the performance of the pump, receive, in an online mode, the pump head (DP) value from the pump head sensor associated with the pump, compute a pump flow (Q) based on the Q-DP polynomial equation, compare the computed pump flow (Q) to a preset target flow rate, and automatically control a pump parameter of the pump such that the calculated flow rate becomes the preset target flow rate.

An eleventh aspect of the present disclosure includes the tenth aspect, where calculating, with the electronic control unit, the inverse of the polynomial equation defining the DP-Q performance curve of the pump includes determining a DP-Q polynomial equation corresponding to the DP-Q performance curve, sampling the DP-Q polynomial equation within a predefined pump head (DP) range, computing a least square optimization of the sampled data thereby generating coefficients for the Q-DP polynomial equation.

A twelfth aspect of the present disclosure includes the eleventh aspect, where computing the least square optimization to generate coefficients for the Q-DP polynomial equation includes maintaining the 1st derivative of the Q-DP polynomial equation to be less than zero.

A thirteenth aspect of the present disclosure includes the twelfth aspect, where computing the least square optimization to generate coefficients for the Q-DP polynomial equation includes maintaining the 1st and 2nd derivatives of the Q-DP polynomial equation to be less than zero.

A fourteenth aspect of the present disclosure includes any one of the eleventh through thirteenth aspects, where computing the least square optimization to generate coefficients for the Q-DP polynomial equation includes minimizing the error in flow obtained from the new (Q') and original (Q) pump curve.

A fifteenth aspect of the present disclosure includes any one of the tenth through fourteenth aspects, where the pump parameter is at least one of a pump speed or an opening of a choke valve associated with the fluid pump.

A sixteenth aspect of the present disclosure includes any one of the tenth through fifteenth aspects, where the pump flow is computed in intervals of 10 minutes or less, optionally 30 minutes or less, optionally 60 minutes or less.

A seventeenth aspect of the present disclosure includes any one of the tenth through sixteenth aspects, where the Q-DP polynomial equation is monotonic.

In an eighteenth aspect of the present disclosure, a method for determining a pump flow of a pump includes determining a DP-Q polynomial equation corresponding to a DP-Q performance curve of a pump, sampling the DP-Q polynomial equation within a predefined pump head (DP) range, and computing a least square optimization of the sampled DP-Q polynomial equation thereby generating coefficients for a Q-DP polynomial equation defining an inverse of the DP-Q polynomial equation.

A nineteenth aspect of the present disclosure includes the eighteenth aspect, where computing the least square optimization to generate coefficients for the Q-DP polynomial equation includes maintaining the 1st and 2nd derivatives of the Q-DP polynomial equation to be less than zero.

A twentieth aspect of the present disclosure includes any one of the eighteenth through nineteenth aspects, where computing the least square optimization to generate coefficients for the Q-DP polynomial equation includes minimizing the error in flow obtained from the new (Q') and original (Q) pump curve.

What is claimed is:

1. A method for determining a pump flow (Q) of a pump, the method comprising:
calculating an inverse of a polynomial equation defining a DP-Q performance curve of a pump, wherein the inverse is a Q-DP polynomial equation defining the performance of the pump;
receiving a pump head (DP) value from a pump head sensor associated with the pump;
computing a pump flow based on the Q-DP polynomial equation;
comparing the computed pump flow to a preset target flow rate; and
automatically controlling a pump parameter of the pump such that the calculated flow rate becomes the preset target flow rate.

2. The method of claim 1, wherein calculating the inverse of the polynomial equation defining the DP-Q performance curve of the pump comprises:
determining a DP-Q polynomial equation corresponding to the DP-Q performance curve;
sampling the DP-Q polynomial equation within a predefined pump head (DP) range;
computing a least square optimization of the sampled DP-Q polynomial equation thereby generating coefficients for the Q-DP polynomial equation.

3. The method of claim 2, wherein computing the least square optimization to generate coefficients for the Q-DP polynomial equation includes maintaining the $1^{st}$ derivative of the Q-DP polynomial equation to be less than zero.

4. The method of claim 3, wherein computing the least square optimization to generate coefficients for the Q-DP polynomial equation includes maintaining the $1^{st}$ and $2^{nd}$ derivatives of the Q-DP polynomial equation to be less than zero.

5. The method of claim 2, wherein computing the least square optimization to generate coefficients for the Q-DP polynomial equation includes minimizing the error in flow obtained from the new (Q') and original (Q) pump curve.

6. The method of claim 1, wherein the pump parameter is a speed of a motor of the pump.

7. The method of claim 1, wherein the pump parameter is a degree of opening of a choke valve of the pump.

8. The method of claim 1, wherein the pump flow (Q) is computed in intervals of 10 minutes or less, optionally 30 minutes or less, optionally 60 minutes or less.

9. The method of claim 1, wherein the Q-DP polynomial equation is monotonic.

10. A pump control system comprising:
a fluid pump having a pump head sensor configured to determine pump head (DP) value of the fluid pump;
an electronic control unit communicatively coupled to the fluid pump and the pump head sensor, wherein the electronic control unit is configured to:
calculate, in an offline mode, an inverse of a polynomial equation defining a DP-Q performance curve of a pump, wherein the inverse is a Q-DP polynomial equation defining the performance of the pump,
receive, in an online mode, the pump head (DP) value from the pump head sensor associated with the pump,
compute a pump flow (Q) based on the Q-DP polynomial equation,
compare the computed pump flow (Q) to a preset target flow rate, and
automatically control a pump parameter of the pump such that the calculated flow rate becomes the preset target flow rate.

11. The pump control system of claim 10, wherein calculating, with the electronic control unit, the inverse of the polynomial equation defining the DP-Q performance curve of the pump comprises:
determining a DP-Q polynomial equation corresponding to the DP-Q performance curve;
sampling the DP-Q polynomial equation within a predefined pump head (DP) range;
computing a least square optimization of the sampled data thereby generating coefficients for the Q-DP polynomial equation.

12. The pump control system of claim 11, wherein computing the least square optimization to generate coefficients for the Q-DP polynomial equation includes maintaining the $1^{st}$ derivative of the Q-DP polynomial equation to be less than zero.

13. The pump control system of claim 12, wherein computing the least square optimization to generate coefficients for the Q-DP polynomial equation includes maintaining the $1^{st}$ and $2^{nd}$ derivatives of the Q-DP polynomial equation to be less than zero.

14. The pump control system of claim 11, wherein computing the least square optimization to generate coefficients for the Q-DP polynomial equation includes minimizing the error in flow obtained from the new (Q') and original (Q) pump curve.

15. The pump control system of claim 10, wherein the pump parameter is at least one of a pump speed or an opening of a choke valve associated with the fluid pump.

16. The pump control system of claim 10, wherein the pump flow is computed in intervals of 10 minutes or less, optionally 30 minutes or less, optionally 60 minutes or less.

17. The pump control system of claim 10, wherein the Q-DP polynomial equation is monotonic.

18. A method for determining a pump flow of a pump, the method comprising:
determining a DP-Q polynomial equation corresponding to a DP-Q performance curve of a pump;
sampling the DP-Q polynomial equation within a predefined pump head (DP) range; and
computing a least square optimization of the sampled DP-Q polynomial equation thereby generating coefficients for a Q-DP polynomial equation defining an inverse of the DP-Q polynomial equation.

19. The method of claim 18, wherein computing the least square optimization to generate coefficients for the Q-DP polynomial equation includes maintaining the $1^{st}$ and $2^{nd}$ derivatives of the Q-DP polynomial equation to be less than zero.

20. The method of claim 18, wherein computing the least square optimization to generate coefficients for the Q-DP polynomial equation includes minimizing the error in flow obtained from the new (Q') and original (Q) pump curve.

* * * * *